US011080371B2

(12) United States Patent
Jin et al.

(10) Patent No.: US 11,080,371 B2
(45) Date of Patent: Aug. 3, 2021

(54) METHOD AND SYSTEM OF STATE CONSISTENCY PROTECTION FOR INTEL SGX

(71) Applicant: HUAZHONG UNIVERSITY OF SCIENCE AND TECHNOLOGY, Hubei (CN)

(72) Inventors: Hai Jin, Hubei (CN); Weizhong Qiang, Hubei (CN); Zezhao Dong, Hubei (CN)

(73) Assignee: Huazhong University of Science And Technology, Wuhan (CN)

( * ) Notice: Subject to any disclaimer, the term of this patent is extended or adjusted under 35 U.S.C. 154(b) by 436 days.

(21) Appl. No.: 16/169,632

(22) Filed: Oct. 24, 2018

(65) Prior Publication Data

US 2019/0228135 A1    Jul. 25, 2019

(51) Int. Cl.
   *G06F 21/12*        (2013.01)
   *G06F 11/14*        (2006.01)
   *G06F 11/07*        (2006.01)
   *G06F 21/53*        (2013.01)
   (Continued)

(52) U.S. Cl.
   CPC .......... *G06F 21/12* (2013.01); *G06F 9/45558* (2013.01); *G06F 11/0757* (2013.01);
   (Continued)

(58) Field of Classification Search
   CPC .. G06F 21/12; G06F 9/45558; G06F 11/0757; G06F 11/1448; G06F 11/1464;
   (Continued)

(56) References Cited

U.S. PATENT DOCUMENTS

2007/0136593 A1*  6/2007  Plavcan ............... G06F 21/34
                                                    713/172
2009/0298468 A1* 12/2009  Hsu .................. H04W 12/082
                                                    455/411
(Continued)

OTHER PUBLICATIONS

Karande, "SGX:-Log: Securing System Logs With SGX", Apr. 2017, ACM, pp. 19-30 (Year: 2017).*

*Primary Examiner* — Taghi T Arani
*Assistant Examiner* — Gregory A Lane
(74) *Attorney, Agent, or Firm* — Michael X. Ye; Morris, Manning & Martin, LLP

(57) ABSTRACT

The present invention involves with a method and system of state consistency protection for Intel software guard extension (SGX). In a method of state consistency protection for a central processing unit capable of creating enclaves, the central processing unit supports creation of at least one enclave, wherein the central processing unit communicates with a remote server providing services for the central processing unit through remote communication and the remote server has a remote attestation module, configuring the remote attestation module to facilitate the completion of every execution state storing operation and/or every execution state restoring operation, wherein the remote attestation refers to an attestation mechanism by which the central processing unit proves to the remote server that it has created the specific enclave in a local platform so that the remote server trusts the specific enclave. The present invention does not require special hardware and is favorable to cross-platform migration.

5 Claims, 2 Drawing Sheets

(51) Int. Cl.
*G06F 21/74* (2013.01)
*G06F 21/30* (2013.01)
*H04L 9/32* (2006.01)
*H04L 29/06* (2006.01)
*G06F 9/455* (2018.01)
*G06F 21/57* (2013.01)

(52) U.S. Cl.
CPC ...... *G06F 11/1448* (2013.01); *G06F 11/1464* (2013.01); *G06F 21/305* (2013.01); *G06F 21/53* (2013.01); *G06F 21/57* (2013.01); *G06F 21/74* (2013.01); *H04L 9/3236* (2013.01); *H04L 63/0428* (2013.01); *G06F 2221/2149* (2013.01)

(58) Field of Classification Search
CPC ........ G06F 21/305; G06F 21/53; G06F 21/57; G06F 21/74
USPC .......................................................... 726/1
See application file for complete search history.

(56) References Cited

U.S. PATENT DOCUMENTS

| | | | |
|---|---|---|---|
| 2012/0079258 A1* | 3/2012 | Schneider | G06F 13/10 713/1 |
| 2012/0117419 A1* | 5/2012 | Hillman | G06F 11/1658 714/12 |
| 2014/0012940 A1* | 1/2014 | Joshi | G06F 9/45558 709/214 |
| 2014/0013059 A1* | 1/2014 | Joshi | G06F 9/45558 711/144 |
| 2016/0105283 A1* | 4/2016 | Mityagin | H04L 9/12 380/279 |
| 2017/0262201 A1* | 9/2017 | Endo | G06F 3/0638 |
| 2017/0329530 A1* | 11/2017 | Lakshman | G06F 3/0641 |
| 2018/0006820 A1* | 1/2018 | Arasu | H04L 9/3236 |
| 2018/0212971 A1* | 7/2018 | Costa | H04L 63/061 |
| 2018/0241572 A1* | 8/2018 | Miele | H04L 9/0643 |

* cited by examiner

METHOD AND SYSTEM OF STATE CONSISTENCY PROTECTION FOR INTEL SGX

FIELD

The present invention relates to cloud computing and information security, and particularly to a method of state consistency protection for Intel SGX and a system thereof.

BACKGROUND

Intel SGX stands for Intel Software Guard Extension, which is extension of the framework of Intel instruction sets. SGX trusted execution was first introduced by Intel in 2013, with only the concept and principle of SGX, but not the hardware. After then, SGX has been evolved continuously and developed into two versions, namely SGX1 and SGX2. Two years later, the first version of SGX-compatible processors was introduced, which version is named SGX1. Dozens of instructions were newly introduced by Intel SGX for creating enclaves as trusted execution environments to ensure secure execution of user applications. Rather than identifying and isolating malware across the platform, this approach seals the secure operation of legitimate software in an enclave so as to protect it from malware. The enclave is inaccessible to any software, whether authorized or unauthorized. In other words, once software and data are put into an enclave, they are protected even from the operating system and any virtual machine manager (VMM) (hypervisor). The security boundary of an enclave only includes the central processing unit (CPU) and itself. An enclave created by an SGX may be also deemed as a trusted execution environment (TEE).

In addition, it should be noted that Intel is not the only company that has the technology to create enclaves in central processing units. For example, Advanced RISC Machines (ARM) company has the corresponding technology, that is, ARM TrustZone (TZ). The difference of ARM TZ from Intel SGX is that ARM TZ divides a CPU into two separate environments, namely a secure world and a normal world, and the two worlds communicate with each other through self-modifying code (SMC) instructions. Differently, in Intel SGX, one CPU can accommodate multiple enclaves, and concurrent execution is allowed. Of course, by providing multiple secure services isolated from each other in TZ secure world, the same effects of running multiple enclaves can be also achieved.

Cloud computing has brought us not only great convenience but also non-ignorable security issues. Since the exposure of the "PRISM" in 2013, information security has gained extensive attention in governments all over the world, with cloud security identified as an indispensable part. As a trusted computing technology, a trusted execution environment is used as an important tool to protect applications in clouds. There are many ways to create trusted execution environments, such as virtual isolation, and hardware-based isolation. Presently, the most common method of hardware-based isolation involves the use of Intel SGX.

Intel SGX primarily protects address space of user applications. When a system having SGX-compatible basic input/output system (BIOS) is activated, the BIOS divides the memory to define a zone composed of enclave page caches (EPCs). This part of the memory is mapped to the enclave in the application address space. In order to prevent known memory attacks (e.g. memory sniffing), this part of the memory is encrypted. An application based on Intel SGX technology includes plural enclave dynamic libraries. When such an application is executed, a loader uploads the enclave dynamic libraries of the application into EPCs, and uploads the remaining part into the normal memory. When the processor needs to access the data in the enclave, it automatically enters a new CPU mode, which is named as the enclave mode. The enclave mode mandatorily conducts additional security check on hardware for every access to the memory. The contents of the EPCs are encrypted and decrypted by a memory encryption engine (MEE) of the processor. The contents of the EPCs are only decrypted when entering CPU packages and are encrypted when they are sent back to the EPCs. Throughout execution of the enclave, the data are only decrypted in the processor. In this way, confidentiality of the data can be well secured.

Generally, trusted execution environments are subject to issues about state consistency. Taking Intel SGX for example, in the event of breakdown, power down, or application migration, Intel SGX stores the execution state in a disk through a seal operation, and restore execution through an unseal operation at a later proper time. Although attackers are prevented from falsifying state information recorded in disks, they can instead conduct rollback attacks by providing an outmoded state to Intel SGX when Intel SGX restores execution. Another kind of attacks is forking, wherein multiple instances are created for one execution context, so the execution context has multiple states, thereby enabling ordinary rollback attacks. These attacks can damage data in terms of integrity, and are particularly harmful to stateful applications. For example, once financial software which maintains records of user accounts' balances and transactions uses outmoded states when restoring application execution, the consequences can be serious.

While the existing state consistency protection strategies designed for enclave-supporting CPUs can remedy the foregoing problems to some extent, their implementation requires special hardware, and they have concerns related to inferior performance and difficult cross-platform migration. Hence, there is a need for a state consistency protection mechanism that does not require special hardware and favorable to cross-platform migration.

SUMMARY

In view of the shortcomings of the prior art, the present invention provides a method of state consistency protection for Intel software guard extension (SGX) and a system thereof. By using a secure channel established by means of remote attestation, the present invention accomplishes a state consistency protection mechanism that does not rely on special hardware and provides good cross-platform migration, thereby addressing the shortcomings of the traditional state consistency protection mechanisms that rely on special hardware, such as poor performance and poor cross-platform migration.

According to a preferred mode, the present invention provides a method of state consistency protection for a central processing unit capable of creating enclaves, wherein the method of state consistency protection involves Intel software guard extension (SGX) installed on the central processing unit. Wherein the central processing unit can create at least one enclave. Wherein the central processing unit communicates with a remote server providing services for the central processing unit through remote communication and the remote server has a remote attestation module, the remote communication including at least a secure cryptographic channel. The remote attestation module are configured to facilitate the completion of every execution state storing operation and execution state restoring operation. Each execution state storing operation further comprises: when an execution state of a specific enclave is to be stored in the central processing unit, calculating a hash value of the execution state to be stored, the specific enclave sending the hash value of the execution state to be stored and a corresponding state storing request to the remote attestation module through the secure cryptographic channel established during remote attestation, and the specific enclave, according to a response of the remote attestation module to the state storing request, performing state storing or error handling. Each execution state restoring operation further comprises: when the stored state of the specific enclave is to be restored, preliminarily restoring a stored state as a present execution state and then calculating a hash value of the present execution state, initiating a remote attestation request from the specific enclave, the remote attestation module sending a hash value of the latest state it stores and comparing the hash value of the latest state it stored with the hash value of present execution state, if the hash value of the latest state is identical to the hash value of the present execution state, determining that the present execution state is the latest state, and ending the execution state restoring operation, and if the hash value of the latest state is different from the hash value of the present execution state, continuing to attempt to restore the next stored state of the specific enclave. Therein, the remote attestation is an attestation mechanism by which the central processing unit proves to the remote server that it has created the specific enclave in a local platform so that the remote server trusts the specific enclave.

According to a preferred mode, the remote attestation module is configured to: establish the secure cryptographic channel between the specific enclave and the remote server and attest: (a) integrity of codes in the specific enclave, (b) the serial number of the specific enclave, (c) the initiation number of the specific enclave, and (d) the hash value of the execution state to be stored, upon completion of the execution state storing operation, record the serial number of the specific enclave, the initiation number of the specific enclave, and the hash value of the execution state to be stored, and after the specific enclave has been initially created and initialized, correspondingly generate an initial initiation number, wherein the initiation number is incrementally set for each subsequent time of state storing, and upon completion of the execution state restoring operation, feedback the hash value of the latest state and the initiation number of the latest state according to the serial number of the specific enclave.

According to a preferred mode, after the remote attestation module receives the hash value of the execution state to be stored and the state storing request, the remote attestation module checks if the hash value of the execution state to be stored exists in the remote server or not, and if the hash value of the execution state to be stored does not exist, it accepts the state storing request, and if the hash value of the execution state to be stored exists, it rejects the state storing request and reports back that the state exists.

According to a preferred mode, after the remote attestation module accepts the state storing request, the specific enclave sends a state-having-been-stored mark to the remote server through three-way handshaking. If the three-way handshaking is successful, the specific enclave an the remote server confirm completion of the state storing of the specific enclave, and the remote attestation module stores the hash value of the execution state to be stored, incrementally sets the initiation number and then stores the initiation number. If the three-way handshaking has failed for a predetermined number of rounds, the specific enclave deletes the stored state of the specific enclave for the present time, and the remote attestation module deletes the hash value of the execution state to be stored.

According to a preferred mode, the step of continuing attempting to restore the next stored state of the specific enclave further comprises: where there is the next stored state for the specific enclave, restoring the next stored state as the present execution state first, and calculating the hash value of the present execution state, comparing the hash value of the latest state sent back by the remote attestation module with the hash value of the present execution state, if the hash value of the latest state is identical to the hash value of the present execution state, determining that present execution state is the latest state, and ending the execution-state restoring operation, and if the hash value of the latest state is different from the hash value of the present execution state, attempting to restore the next stored state of the specific enclave again.

According to a preferred mode, the method further comprises: if the hash values of all the execution states stored in the specific enclave are different from the hash value of the latest state sent back by the remote attestation module, restoring the stored state that has the greatest initiation number and sending back a not-latest-state prompt.

According to a preferred mode, the method further comprises: after communication between the specific enclave and the remote attestation module has been established, the specific enclave and the remote attestation module agreeing on a time-out period for each message during their communication according to a network delay status of the present communication and/or a first significance of the specific enclave, in order to resend the corresponding message when a confirmation of the corresponding message has not been received after the time-out period agreed on.

According to a preferred mode, the step wherein the specific enclave and the remote attestation module according to a network delay status of the present communication and/or a first significance of the specific enclave agree on a time-out period for each message during their communication further comprises: after every time the remote attestation module receives the state storing request, the specific enclave and the remote attestation module agreeing on the time-out period for the message about the state storing of this time during their communication according to the network delay status of the present communication and/or the first significance of the specific enclave.

The present invention also discloses a communication system. The system at least comprises a first communication terminal and a second communication terminal. The first communication terminal has a first central processing unit and the second communication terminal has a second central processing unit. Both of the central processing units support configuring at least one enclave. The first communication terminal communicates with the second communication terminal, the second communication terminal providing services for the first communication terminal through remote communication, and the second communication terminal has a remote attestation module, which is connected to the second central processing unit, the remote communication including at least a secure cryptographic channel. The remote attestation module facilitate the completion of every execution state storing operation and/or execution state restoring operation. The execution state storing operation comprises: when an execution state of a specific enclave is to be stored in the first central processing unit, calculating a hash value of the execution state to be stored, the specific enclave sending the hash value of the execution state to be stored and a corresponding state storing request to the remote attestation module through a secure cryptographic channel established during remote attestation, and the specific enclave, according to a response of the remote attestation module to the state storing request, performing state storing or error handling. Each execution state restoring operation comprises: when the stored state of the specific enclave is to be restored, preliminarily restoring a stored state as a present execution state and then calculating a hash value of the present execution state, initiating a remote attestation request from the specific enclave, the remote attestation module sending a hash value of the latest state it stores and comparing the hash value of the latest state it stores with the hash value of present execution state, if the hash value of the latest state is identical to the hash value of the present execution state, determining that the present execution state is the latest state, and ending the execution-state restoring operation, and if the hash value of the latest state is different from the hash value of the present execution state, continuing attempting to restore the next stored state of the specific enclave. Therein, the remote attestation is an attestation mechanism by which the first central processing unit proves to the second communication terminal that it has created the specific enclave in a local platform so that the second communication terminal trusts the specific enclave.

The present invention also discloses a central processing unit (CPU) based state consistency protection system. The system primarily comprises a first central processing unit and a second central processing unit. Both of the first and second central processing units support creation of at least one enclave. The first central processing unit communicates with the second central processing unit, the second central processing unit providing services for the first central processing unit through remote communication, the remote communication including at least a secure cryptographic channel. The system modifies a remote attestation protocol at base layers of the first central processing unit and the second central processing unit to facilitate the completion of every execution state storing operation and execution state restoring operation. The remote attestation protocol is a base-layer attestation mechanism protocol based on an attestation instruction of the first central processing unit and the second central processing unit, and is for the first central processing unit to prove to the second central processing unit that it has created the specific enclave in a local platform so that the second central processing unit trusts the specific enclave; and wherein each execution state storing operation and each execution state restoring operation use the secure cryptographic channel.

The present invention provides a method of state consistency protection for Intel SGX and a system thereof, and at least has the following benefits:

(1) It sets the remote attestation module required by remote attestation as an operation that facilitates state consistency protection, or directly modifies the remote attestation protocol at the base layer of the central processing unit to set the remote attestation module as an operation that facilitates state consistency protection, so as to directly use the secure cryptographic channel established during the remote attestation to transmit message and perform state consistency attestation, without relying on additional special hardware, therefore every time it is needed to perform context state storing, there is no need to write data in the special hardware, thus the state stored in the enclave can be migrated to different platforms;

(2) When storing a state of a specific enclave, by agreeing on the time-out period at the application layer according to present network delay and significance of the specific enclave, the present invention greatly improves fluency and reliability of the system, and when restoring the state of a specific enclave, it is possible to restore the latest or most recent state;

(3) Since the present invention can be implemented without being bound with any specific hardware, the whole working process is transparent to the upper layers, thus having great versatility and portability.

DETAILED DESCRIPTION

Figure 1:
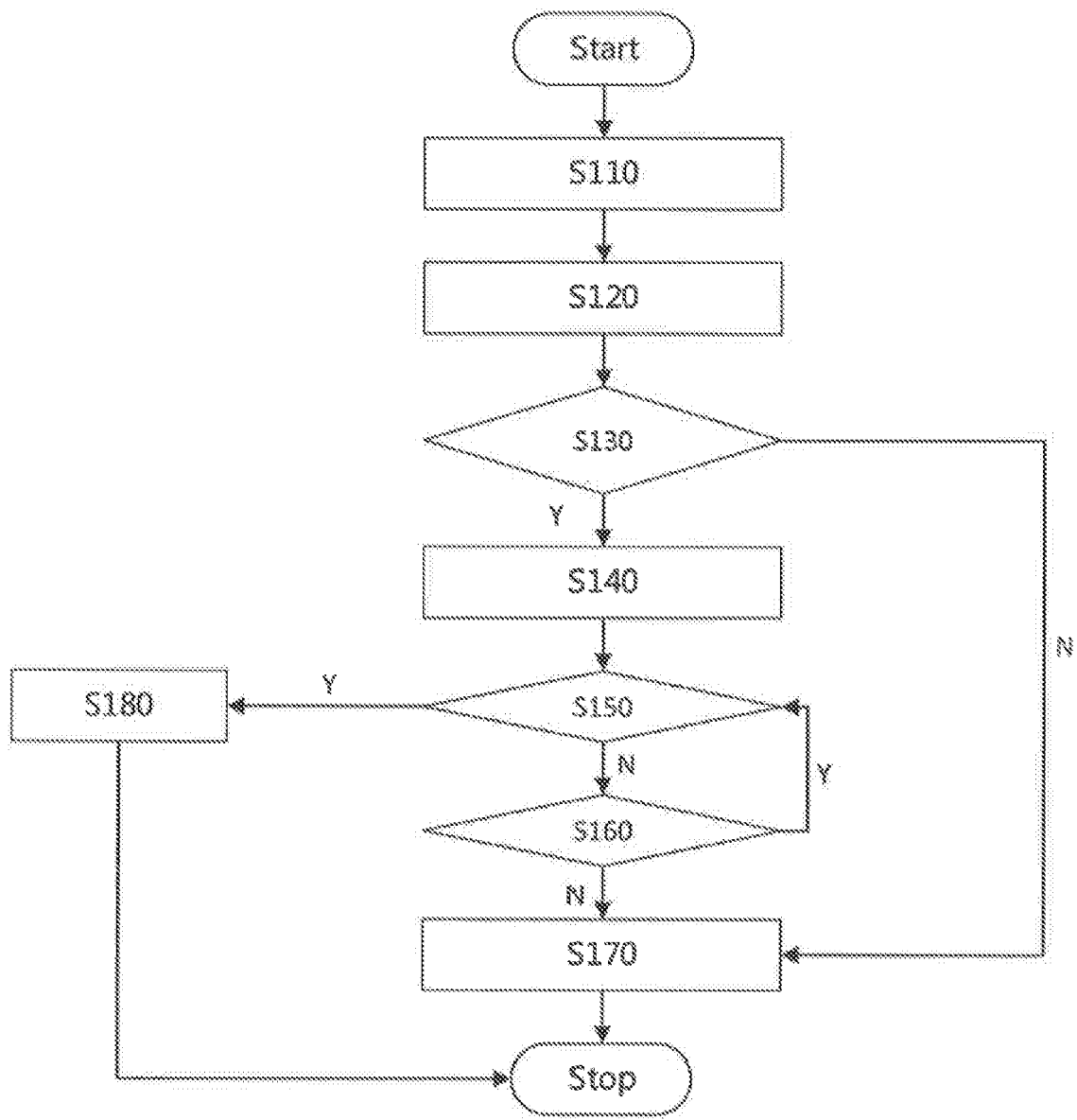
FIG. 1 is a flowchart of an execution state storing operation according to a preferred mode of the present invention.

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

The present embodiment discloses a method of state consistency protection for a central processing unit capable of creating enclaves. Preferably, the present embodiment discloses a method of state consistency protection for Intel software guard extension (SGX) installed on the central processing unit. Without causing conflicts or contradiction, the preferred modes for other embodiments may be incorporated into the present embodiment as supplement.

Preferably, in the disclosed method, the central processing unit supports creation of at least one enclave. Preferably, the enclave is a trusted execution environment created by the central processing unit. The enclave protects codes and data contained therein from malware, and no software can access the enclave, whether it should be authorized or unauthorized. Preferably, the central processing unit may create plural enclaves that can be concurrently executed. For example, a central processing unit supporting Intel SGX creates plural enclaves that can be concurrently executed. Alternatively, the central processing unit may create plural sub-enclaves in one enclave. For example, a central processing unit supporting Advanced RISC Machines (ARM) TrustZone creates a secure world, and creates plural secure services that are mutually separated in the secure world. Herein, the secure world is equivalent to an enclave, and secure services are equivalent to sub-enclaves.

Preferably, in the disclosed method, the central processing unit communicates with a remote server providing services for the central processing unit through remote communication. Preferably, the central processing unit is installed in a client. The client is not necessarily a user terminal. For example, the client may alternatively be a server that provides services to the devices remotely connected thereto.

Preferably, remote server may have a remote attestation module, the remote communication including at least a secure cryptographic channel.

According to a preferred mode, the method may comprise: configuring the remote attestation module to facilitate every execution state storing operation and execution state restoring operation. The known approaches to state consistency protection typically use a combination of a counter and a trusted platform module (hereinafter referred to as the TPM hardware), and involve storing execution states together with counter readings and then storing the counter readings in the TPM hardware. For restoring the execution state, the counter reading associated with the execution state is compared with that stored in the TPM. If the two are the same, restoring is performed; otherwise, restoring fails. However, the TPM hardware can only work in the present platform and does not support cross-platform migration. In the present invention, since the central processing unit is capable of creating enclaves, for a specific enclave it creates to earn trust from a remote server, remote attestation is required anyway. In this way, the disclosed method is positioned to use the hardware infrastructure required by the remote attestation to accomplish state consistency protection, thereby solving the problems of the traditional state-consistency protection mechanisms relying on special hardware, such as poor performance and difficult cross-platform migration. Preferably, the remote attestation module may be integrated in the remote server. More preferably, the remote attestation module may be integrated in the central processing unit of the remote server. Preferably, the remote attestation module may be at least one of an application-specific integrated circuit (ASIC), a FPGA, a CPU, a general computer or any other hardware capable of processing and/or transmitting data.

According to a preferred mode, each execution state storing operation may further comprise: where an execution state of a specific enclave is to be stored in the central processing unit, calculating a hash value of the execution state to be stored. Preferably, the specific enclave is a certain particular enclave created by the central processing unit. Preferably, the hash value is a unique and very compact quantitative expression of a segment of data. If a hash plaintext string is changed, even if the change only involves one letter in the plaintext, the subsequent hash value varies. It is almost impossible to find two entries having an identical hash value by means of computation. In the present invention, the hash value of an execution state is a value obtained using logic operation according to the data of the execution state, and different execution states come with different hash values. Thus, by calculating the hash value of an execution state and comparing the result to the hash values stored in a remote server, determination and protection of state consistency can be achieved.

According to a preferred mode, each execution state storing operation may further comprise: the specific enclave sending the hash value of the execution state to be stored and a corresponding state storing request to the remote attestation module through the secure cryptographic channel established during remote attestation. Preferably, the remote attestation refers to an attestation mechanism by which the local device proves to the remote device that it has created the specific enclave in the local platform so that the remote device trusts the specific enclave. For example, the central processing unit proves to the remote server that it has created the specific enclave in the local platform so that the remote server trusts the specific enclave. Particularly, the remote attestation is about attesting whether the specific enclave has performed instantiation properly and runs in a central processing unit that is really capable of creating enclaves. Only after attestation, can the service provider trust the specific enclave and provide it with confidential information through an attested channel. Taking Intel SGX for example, the enclave combines the information summary of the corresponding software with the exclusive, asymmetric key coming from the hardware platform that runs the corresponding software, so as to generate a report, and sends the report to the remote server through an attested channel. Once the remote server confirms that the enclave has got an entity properly created and runs in a processor that really supports Intel SGX, the remote server trusts the enclave and provides it with confidential information through an attested channel.

According to a preferred mode, each execution state storing operation may further comprise: the specific enclave, according to a response of the remote attestation module to the state-storing request, performing state storing or error handling.

According to a preferred mode, each execution state restoring operation may further comprise: where the stored state of the specific enclave is to be restored, preliminarily restoring a stored state as a present execution state and then calculating a hash value of the present execution state. Preferably, for restoring an execution state, attempts to restore the state may be made in a descending order of the initiation numbers. For example, where there are seven execution states stored locally, with initiation numbers 0 to 7, the execution state having the initiation number of 7 is first used for state restoring.

According to a preferred mode, each execution state restoring operation may further comprise: initiating a remote attestation request from the specific enclave, the remote attestation module sending a hash value of the latest state it stores and comparing the hash value of the latest state it stores with the hash value of present execution state. Preferably, the hash value of the latest state is the hash value of one of the execution states that have been successfully stored in the remote attestation module.

According to a preferred mode, each execution state restoring operation may further comprise: if the hash value of the latest state is identical to the hash value of the present execution state, determining that the present execution state is the latest state, and ending the execution state restoring operation.

According to a preferred mode, each execution state restoring operation may further comprise: if the hash value of the latest state is different from the hash value of the present execution state, continuing to attempt to restore the next stored state of the specific enclave.

According to a preferred mode, the remote attestation module may be configured to: establish the secure cryptographic channel between the specific enclave and the remote server and attest: (a) integrity of codes in the specific enclave, (b) a serial number of the specific enclave, (c) an initiation number of the specific enclave, and (d) the hash value of the execution state to be stored. In this way, the disclosed method can directly use the secure cryptographic channel established between the specific enclave and the remote server to perform the execution state storing operation and execution state restoring operation. As there is no need to create any cryptographic channel additionally, the computing costs, communication costs and implementation difficulty can be reduced.

According to a preferred mode, the remote attestation module may be further configured to: selectively attest integrity of codes in the specific enclave according to a predetermined means. Preferably, the predetermined means may include at least one of setting an attestation cycle, setting an attestation frequency and conducting random attestation. Since the remote attestation module is configured to facilitate every execution state storing operation and/or execution state restoring operation, the number of times of remote attestation is significantly greater than in the case where the secure cryptographic channel is not such configured. It is unnecessary to attest the integrity of the codes in the specific enclave every time. Thus, in this way, the computing costs and hardware costs of the remote attestation module can be reduced and the fluency of the system can be improved.

According to a preferred mode, the remote attestation module may further be configured to: upon completion of the execution state storing operation, record the serial number of the specific enclave, the initiation number of the specific enclave, and the hash value of the execution state to be stored, and after the specific enclave has been initially created and initialized, correspondingly generate an initial initiation number, wherein the initiation number is incrementally set for each subsequent time of state storage. For example, after the specific enclave has been initially created and initialized, the initiation number is 0. Every time the state is stored, the initiation number is added by 1. In this way, it is possible to locate the corresponding stored state rapidly, thereby speeding up the state restoring operation.

According to a preferred mode, the remote attestation module may further be configured to: upon completion of the execution state restoring operation, feedback the hash value and the initiation number of the latest state according to the serial number of the specific enclave.

According to a preferred mode, after the remote attestation module receives the hash value of the execution state to be stored and the state storing request, it checks if the hash value of the execution state to be stored exists in the remote server or not, if the hash value of the execution state to be stored does not exist, it accepts the state storing request, and if the hash value of the execution state to be stored exists, it rejects the state storing request and reports back that the state exists. In this way, repeated storing of the same state can be prevented, thereby reducing the storage costs of the system and the computing costs for restoring operations.

According to a preferred mode, after the remote attestation module accepts the state storing request, the specific enclave sends a state-having-been-stored mark to the remote server through three-way handshaking. If the three-way handshaking is successful, the specific enclave and the remote server confirm storage of the state of the specific enclave, and the remote attestation module stores the hash value of the execution state to be stored, incrementally sets the initiation number and then stores the initiation number, and if the three-way handshaking has failed for a predetermined number of rounds, the specific enclave deletes the state of the specific enclave it has stored for the present time, and the remote attestation module deletes the hash value of the execution state to be stored. In this way, it can be ensured that the two parties have completed the state storage of the specific enclave, thereby improving the reliability of the present invention.

According to a preferred mode, the step of continuing attempting to restore the next stored state of the specific enclave may further comprise: where there is the next stored state of the specific enclave, restoring the next stored state as the present execution state first, and calculating the hash value of the present execution state, comparing the hash value of the latest state sent back by the remote attestation module with the hash value of the present execution state, if the hash value of the latest state is identical to the hash value of the present execution state, determining that present execution state is the latest state, and ending the execution state restoring operation, and if the hash value of the latest state is different from the hash value of the present execution state, attempting to restore the next stored state of the specific enclave again. In this way, it is possible to make attempts restoring the state by traversing all the available stored states when the latest state has not been identified, thereby improving the restorability of the present invention.

According to a preferred mode, the method may further comprise: if the hash values of all the execution states stored in the specific enclave are different from the hash value of the latest state sent back by the remote attestation module, restoring the stored state that has the greatest initiation number and sending back a not-latest-state prompt. In this way, the present invention maximizes the possibility of restoring the second newest state, and allows the two parties to know about how the state is restored rapidly by returning the not-latest-state prompt.

According to a preferred mode, the method may further comprise: after communication between the specific enclave and the remote attestation module has been established, the specific enclave and the remote attestation module agreeing on a time-out period for each message during their communication according to a network delay status of the present communication and a first significance of the specific enclave, so that when a confirmation of a corresponding message has not been received after the time-out period, the corresponding message is resent. Traditionally, the time-out period for messages is agreed on in the protocol layer, so the same time-out period is applied to each message. This is adverse to optimization of the time-out period for the corresponding message according to the actual status of network delay and/or the actual significance of the specific enclave. A time-out period that is set too short in the protocol layer can greatly increase communication costs and can in turn aggravate network delay, leading to vicious circles. When the time-out periods set for messages sent by all enclaves are the same, due to different significance level, it is difficult to coordinate specific time-out period. The present invention makes the specific enclave and the remote attestation module agree on a time-out period for each message during their communication according to a network delay status of the present communication and/or a first significance of the specific enclave. In other words, the time-out period for each message during their communication is agreed on in the application layer. This allows time-out periods to be set reasonably according to the actual status of network delay, so that when network delay is low, operations can be rapidly done, thereby improving the system in terms of efficiency and reliability, and when network delay is high, the frequency of resending message can be decreased, thereby preventing more frequent resending from aggravating network delay and improving the system in terms of reliability. This also allows the time-out periods to be set according to the actual significance of every specific enclave, so that for a less significant specific enclave, a relatively long time-out period can be set, thereby reducing communication costs, and for a more significant specific enclave, a relatively short time-out period can be set, thereby ensuring the reliability for state consistency.

According to a preferred mode, the method may further comprise: after the specific enclave and the remote attestation module agree on a time-out period for each message during their communication according to a network delay status of the present communication and/or a first significance of the specific enclave, the remote attestation module further adjusting the time-out period of each message according to a second significance of the central processing unit containing the specific enclave. Since the central processing units in which the enclaves exist may be located in different clients, users at different clients may have different levels of significance. For example, for different users, the remote server may determine the second significance of a user according to at least one of the credit rating, limit per transaction and account balance of the user. The more significant user is associated with the higher level of the second significance. In this way, the state consistency of the enclaves related to high significance users can be ensured in precedence, thereby improving user experience and minimizing potential risks throughout the process.

According to a preferred mode, the step where the specific enclave and the remote attestation module, according to a network delay status of the present communication and/or a first significance of the specific enclave, agree on a time-out period for each message during their communication may comprise: after every time the remote attestation module receives a state storing request, the specific enclave and the remote attestation module agreeing on the time-out period for the message about the state storage of this time during their communication according to the network delay status of the present communication and/or the first significance of the specific enclave. In this way, the time-out period for the message about the state storage of this time can be such set that it conforms to the real-time network delay status after each state storing request is sent and/or the first significance of the specific enclave. This allows that every state storage has its optimized time-out period, thereby greatly optimizing the time-out period for messages related to the state storage of this time. Since the duration of state storage of each time is optimized, the reliability of the present invention can be improved. Assuming that there are a fixed times of failure such as breakdown and power down happening to a client in a certain period of time, once the duration of state storage is optimized, the share of the duration of state storage taken in this certain period of time is small, thereby reducing the risk that the client fails during the execution state storing operation and further ensuring state consistency.

Embodiment 2

The present embodiment is further improvement based on Embodiment 1, and the repeated description is omitted herein. Without causing conflicts or contradiction, the preferred modes for other embodiments may be incorporated into the present embodiment as supplement.

The present invention also discloses a communication system. The system is suitable for implementing the steps of the method of the present invention, so as to achieve the expected technical effects.

According to a preferred mode, a communication system may comprise a first communication terminal and a second communication terminal. Preferably, the first communication terminal has a first central processing unit and the second communication terminal has a second central processing unit. The first central processing unit and the second central processing unit both support creation of at least one enclave. Preferably, the first communication terminal communicates with the second communication terminal, the second communication terminal providing services for the first communication terminal through remote communication. Preferably, the second communication terminal may have a remote attestation module. Preferably, the remote attestation module is connected to the second central processing unit. Alternatively, the remote attestation module is integrated in the second central processing unit, the remote communication including at least a secure cryptographic channel.

According to a preferred mode, the remote attestation module is configured to facilitate every execution state storing operation and execution state restoring operation.

According to a preferred mode, each execution state storing operation may comprise: when an execution state of a specific enclave is to be stored in the first central processing unit, calculating a hash value of the execution state to be stored, the specific enclave sending the hash value of the execution state to be stored and a corresponding state storing request to the remote attestation module through a secure cryptographic channel established during remote attestation, and the specific enclave, according to a response of the remote attestation module to the state-storing request, performing state storage or error handling.

Preferably, the remote attestation is an attestation mechanism by which the first central processing unit proves to the second communication terminal that it has created the specific enclave in a local platform so that the second communication terminal trusts the specific enclave.

Embodiment 3

The present embodiment is further improvement based on Embodiment 1, 2 or a combination thereof, and the repeated description is omitted herein. Without causing conflicts or contradiction, the preferred modes for other embodiments may be incorporated into the present embodiment as supplement.

The present embodiment discloses a central processing unit (CPU) based state consistency protection system. The system is suitable for implementing the steps of the method of the present invention, so as to achieve the expected technical effects.

According to a preferred mode, the system may comprise a first central processing unit and a second central processing unit. Preferably, the first central processing unit and the second central processing unit both support creation of at least one enclave. Preferably, the first central processing unit communicates with the second central processing unit, the second central processing unit providing services for the first central processing unit through remote communication, the remote communication including at least a secure cryptographic channel.

According to a preferred mode, the systems involves modifying a remote attestation agreement at base layers of the first central processing unit and the second central processing unit to facilitate every execution state storing operation and execution state restoring operation. By modifying the remote attestation agreement of the base layer directly, the disclosed system can directly use the hardware of the first central processing unit and the second central processing unit to accomplish state consistency protection, without being bound with any specific hardware, the whole working process is transparent to the upper layers, thus having great versatility and portability.

According to a preferred mode, when an execution state of a specific enclave is to be stored in the first central processing unit, calculating a hash value of the execution state to be stored.

Preferably, the remote attestation agreement is a base-layer attestation mechanism protocol based on an attestation instruction of the first and second central processing units, and is for the first central processing unit to prove to the second central processing unit that it has established the specific enclave in a local platform so that the second central processing unit trusts the specific enclave.

Preferably, when facilitating execution state storing operations, the second central processing unit records the serial number of the specific enclave, the initiation number of the specific enclave, and the hash value of the execution state to be stored, and after the specific enclave has been initially created and initialized, correspondingly generates an initial initiation number, wherein the initiation number is incrementally set for each subsequent time of state storage, and upon completion of the execution state restoring operation, the second central processing unit feeds back the hash value and the initiation number of the latest state according to the serial number of the specific enclave.

According to a preferred mode, the first central processing unit may be installed in a local client. The second central processing unit may be installed in a remote server.

According to a preferred mode, after the second central processing unit receives the hash value of the execution state to be stored and the state storing request, it checks if the hash value of the execution state to be stored exists in the remote server or not, and if the hash value of the execution state to be stored does not exist, it accepts the state storing request, and if the hash value of the execution state to be stored exists, it rejects the state storing request and reports back that the state exists.

According to a preferred mode, after the second central processing unit accepts the state storing request, the specific enclave sends a state-having-been-stored mark to the remote server through three-way handshaking, if the three-way handshaking is successful, the specific enclave and the remote server confirm storage of the state of the specific enclave, and the remote attestation module stores the hash value of the execution state to be stored, incrementally sets the initiation number and then stores the initiation number, and if the three-way handshaking has failed for a determined number of rounds, the specific enclave deletes the state of the specific enclave it has stored for the present time, and the remote attestation module deletes the hash value of the execution state to be stored.

According to a preferred mode, the step of continuing attempting to restore the next stored state of the specific enclave comprises: where there is the next stored state of the specific enclave, restoring the next stored state as the present execution state first, and calculating the hash value of the present execution state, and comparing the hash value of the latest state sent back by the remote attestation module with the hash value of the present execution state, if the hash value of the latest state is identical to the hash value of the present execution state, determining that the present execution state is the latest state, and ending the execution state restoring operation, and if the hash value of the latest state is different from the hash value of the present execution state, attempting to restore the next stored state of the specific enclave again.

According to a preferred mode, the method further comprises: if the hash values of all the execution states stored in the specific enclave are different from the hash value of the latest state sent back by the remote attestation module, restoring the stored state that has the greatest initiation number and sending back a not-latest-state prompt.

According to a preferred mode, the method further comprises: after communication between the specific enclave and the remote attestation module has been established, the specific enclave and the remote attestation module agreeing on a time-out period for each message during their communication according to a network delay status of the present communication and/or a first significance of the specific enclave, so that when a confirmation of a corresponding said message has not been received after the time-out period, the corresponding message is resent.

According to a preferred mode, the step where the specific enclave and the second central processing unit, according to a network delay status of the present communication and/or a first significance of the specific enclave, agree on a time-out period for each message during their communication comprises: every time after the second central processing unit receives a state storing request, the specific enclave and the second central processing unit, according to a network delay status of the present communication and/or a first significance of the specific enclave, agree on the time-out period for the message about the state storage of this time during communication between the specific enclave and the second central processing unit.

Embodiment 4

The present embodiment is further improvement based on Embodiment 1, 2, 3 or a combination thereof, and the repeated description is omitted herein. Without causing conflicts or contradiction, the preferred modes for other embodiments may be incorporated into the present embodiment as supplement.

According to a preferred mode, as shown in FIG. 1, each execution state storing operation may comprise the following sub steps:

Step S110: when an execution state of a specific enclave is to be stored in the first central processing unit, calculating a hash value of the execution state to be stored, sending the hash value of the execution state through a secure cryptographic channel established between the specific enclave and the remote attestation module, and then the method proceeding with Step S120;

Step S120: after the remote attestation module receives the state storing request, the remote attestation module checking if the hash value of the execution state to be stored exists in the remote server or not, if the hash value of the execution state to be stored does not exist, feeds back that it accepts the state storing request, and if the hash value of the execution state to be stored exists, reports back that it rejects the state storing request, and then the method proceeding with Step S130;

Step S130: the specific enclave receiving the response to the state storing request, determining whether the remote attestation module accepts the state storing request, and if the remote attestation module accepts the state storing request, the method proceeding with Step S140, and if the remote attestation module rejects the state storing request, the method proceeding with Step S170;

Step S140: the specific enclave storing the present execution state, sending a state-having-been-stored mark to the remote attestation module through three-way handshaking, and the method proceeding with Step S150;

Step S150: determining whether the three-way handshaking of this time is successful, and if it is successful, the method proceeding with Step S180, and if it is not successful, the method proceeding with Step S160;

Step S160: determining whether the present three-way handshaking has failed for four or fewer rounds in a row, if the present three-way handshaking has failed for four or fewer rounds in a row, sending the state-having-been-stored mark to the remote attestation module through three-way handshaking again and the method proceeding with Step S150, or if the present three-way handshaking has failed for five or more rounds in a row, the method proceeding with Step S170;

Step S170: the specific enclave deleting the stored execution state, and the remote attestation module deleting the hash value of the execution state;

Step S180: the specific enclave and the remote server completing the state storage for the specific enclave, and the remote attestation module storing the hash value of the execution state, adding one to the initiation number and then storing it.

Figure 2:
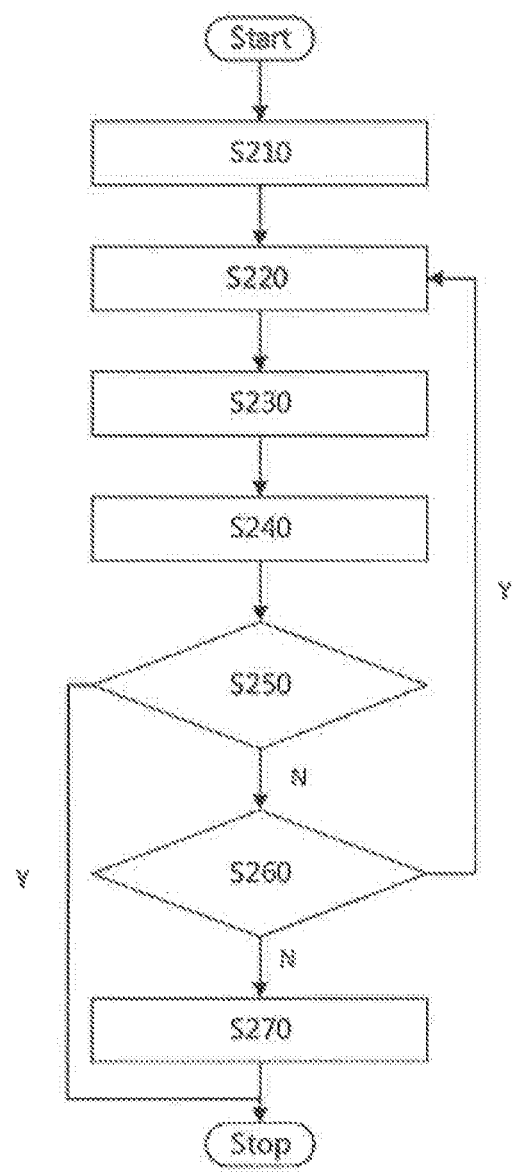
FIG. 2 is a flowchart of an execution state restoring operation according to a preferred mode of the present invention.

According to a preferred mode, referring to FIG. 2, the execution state restoring operation may comprise the following sub steps:

Step S210: selecting a stored state of a specific enclave in a disk for restoring operation, and then the method proceeding with Step S220;

Step S220: the specific enclave initiating attestation to the remote attestation module and establishing a secure cryptographic channel, the two parties agreeing on the time-out period for messages according to network delay status, the remote attestation module returning the hash value and initiation number of the latest state, and in case the acknowledgement (ACK) of the response message exceeds the time-out period, the specific enclave resending the response message, and then the method proceeding with Step S230;

Step S230: the specific enclave receiving the responding message, sending its responding message ACK, and then the method proceeding with Step S240;

Step S240: the specific enclave calculating the hash value of the present execution state, and then the method proceeding with Step S250;

Step S250: the specific enclave comparing the hash value of the present execution state to the hash value of the latest state returned by the remote attestation module to see whether they are the same, if they are the same, the present state being taken as the latest state for restoring operation, and if they are not the same, the method proceeding with Step S260;

Step S260: determining whether there is a next stored state of the specific enclave, if there is a next stored state of the specific enclave, selecting the next stored state and taking it as the new present stored state, and then the method proceeding with Step S220, and if there is no next stored state of the specific enclave, the method proceeding with Step S270;

Step S270: selecting the state having the greatest initiation number for restoring, sending back a not-latest-state prompt, and ending the process.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A method of state consistency protection for a central processing unit capable of creating enclaves, particularly a method of state consistency protection for Intel software guard extension (SGX), wherein, the central processing unit supports creation of at least one enclave, wherein, the central processing unit communicates with a remote server providing services for the central processing unit through remote communication and the remote server has a remote attestation module, the method being characterized in:

configuring the remote attestation module to facilitate the completion of every execution state storing operation and/or every execution state restoring operation;

the execution state storing operation comprising:

when it is needed to store an execution state of a specific enclave in the central processing unit, calculating a hash value of the execution state to be stored, the specific enclave sending the hash value of the execution state to be stored and a corresponding state storing request to the remote attestation module through a secure cryptographic channel established during remote attestation, and the specific enclave, according to a response of the remote attestation module to the state storing request, performing state storing or error handling;

the execution state restoring operation comprising:

when it is needed to restore the stored state of the specific enclave, preliminarily restoring a stored state as a present execution state and then calculating a hash value of the present execution state, initiating a remote attestation request from the specific enclave, the remote attestation module sending the hash value of the latest state it stores, and comparing the hash value of the latest state it stores with the hash value of present execution state, if the hash value of the latest state is identical to the hash value of the present execution state, determining that the present execution state is the latest state, and ending the execution state restoring operation, and if the hash value of the latest state is different from the hash value of the present execution state, continuing attempting to restore the next stored state of the specific enclave;

wherein, the remote attestation refers to an attestation mechanism by which the central processing unit proves to the remote server that it has created the specific enclave in a local platform so that the remote server trusts the specific enclave, wherein the step of continuing attempting to restore the next stored state of the specific enclave comprises:

where there is the next stored state for the specific enclave, restoring the next stored state as the present execution state first, and calculating the hash value of the present execution state, comparing the hash value of the latest state sent back by the remote attestation module with the hash value of the present execution state, if the hash value of the latest state is identical to the hash value of the present execution state, determining that present execution state is the latest state, and ending the execution state restoring operation, and if the hash value of the latest state is different from the hash value of the present execution state, attempting to restore the next stored state of the specific enclave again.

2. The method of claim 1, wherein the remote attestation module is configured to:

establish the secure cryptographic channel between the specific enclave and the remote server and attest integrity of codes in the specific enclave, a serial number of the specific enclave, an initiation number of the specific enclave, and the hash value of the execution state to be stored, upon completion of the execution state storing operation, record the serial number of the specific enclave, the initiation number of the specific enclave, and the hash value of the execution state to be stored, and after the specific enclave has been initially created and initialized, correspondingly generate an initial initiation number, wherein the initiation number is incrementally set for each subsequent time of state storing, and upon completion of the execution state restoring operation, feed back the hash value of the latest state and the initiation number of the latest state according to the serial number of the specific enclave.

3. The method of claim 1, wherein after the remote attestation module receives the hash value of the execution state to be stored and the state storing request, the remote attestation module checks if the hash value of the execution state to be stored exists in the remote server or not, and if the hash value of the execution state to be stored does not exist, it accepts the state storing request, and if the hash value of the execution state to be stored already exists, it rejects the state storing request and reports back that the execution state already exists.

4. The method of claim 3, wherein after the remote attestation module accepts the state storing request, the specific enclave sends a state-having-been-stored mark to the remote server through three-way handshaking, and if the three-way handshaking is successful, the specific enclave and the remote server confirm completion of the state storing of the specific enclave, and the remote attestation module stores the hash value of the execution state to be stored, incrementally sets the initiation number and then stores the initiation number, and if the three-way handshaking has failed for a determined number of rounds, the specific enclave deletes the stored state of the specific enclave for the present time, and the remote attestation module deletes the hash value of the execution state to be stored.

5. The method of claim 1, wherein the method further comprises:

if the hash values of all the execution states stored in the specific enclave are different from the hash value of the latest state sent back by the remote attestation module, restoring the stored state that has the greatest initiation number and sending back a not-latest-state prompt.

* * * * *